Feb. 1, 1955
E. GAGNAN
2,700,876
PLANT FOR FORCING GAS UNDER PRESSURE FROM THE LIQUEFIED GAS
Filed Dec. 3, 1951
3 Sheets-Sheet 1
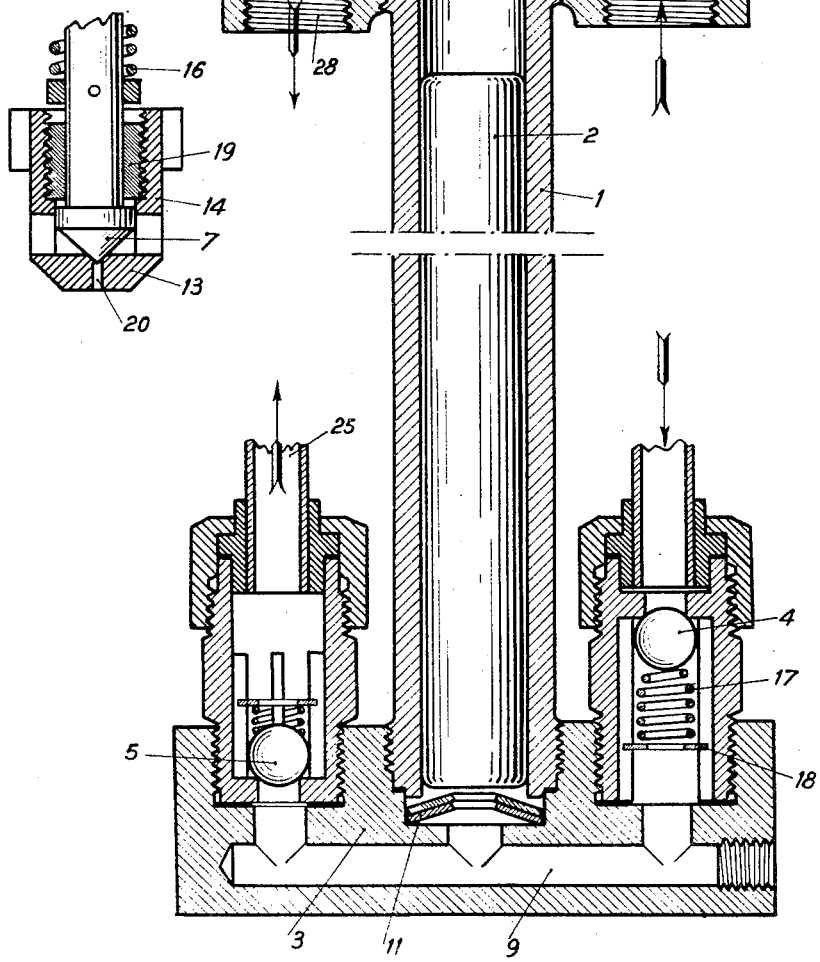
Inventor
Emile Gagnan
By Alan Swabey
Attorney

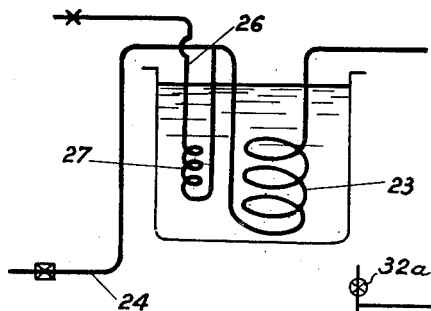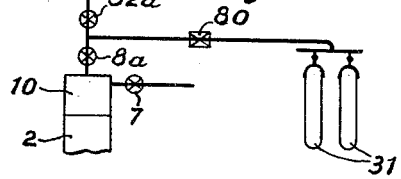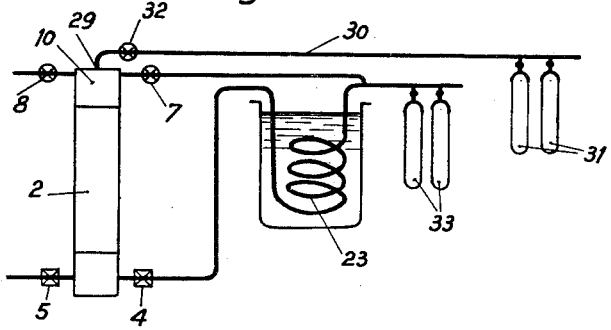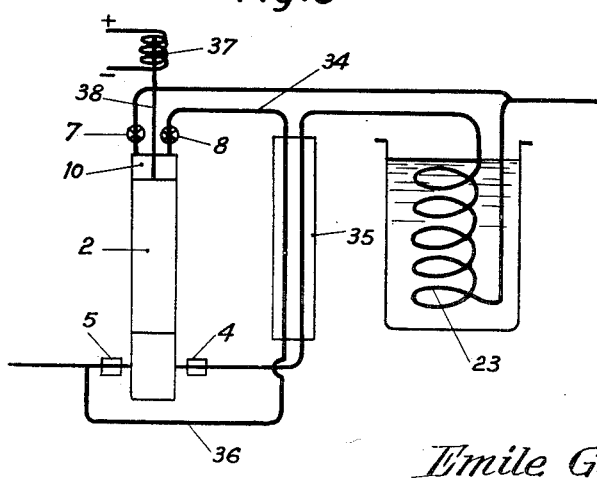

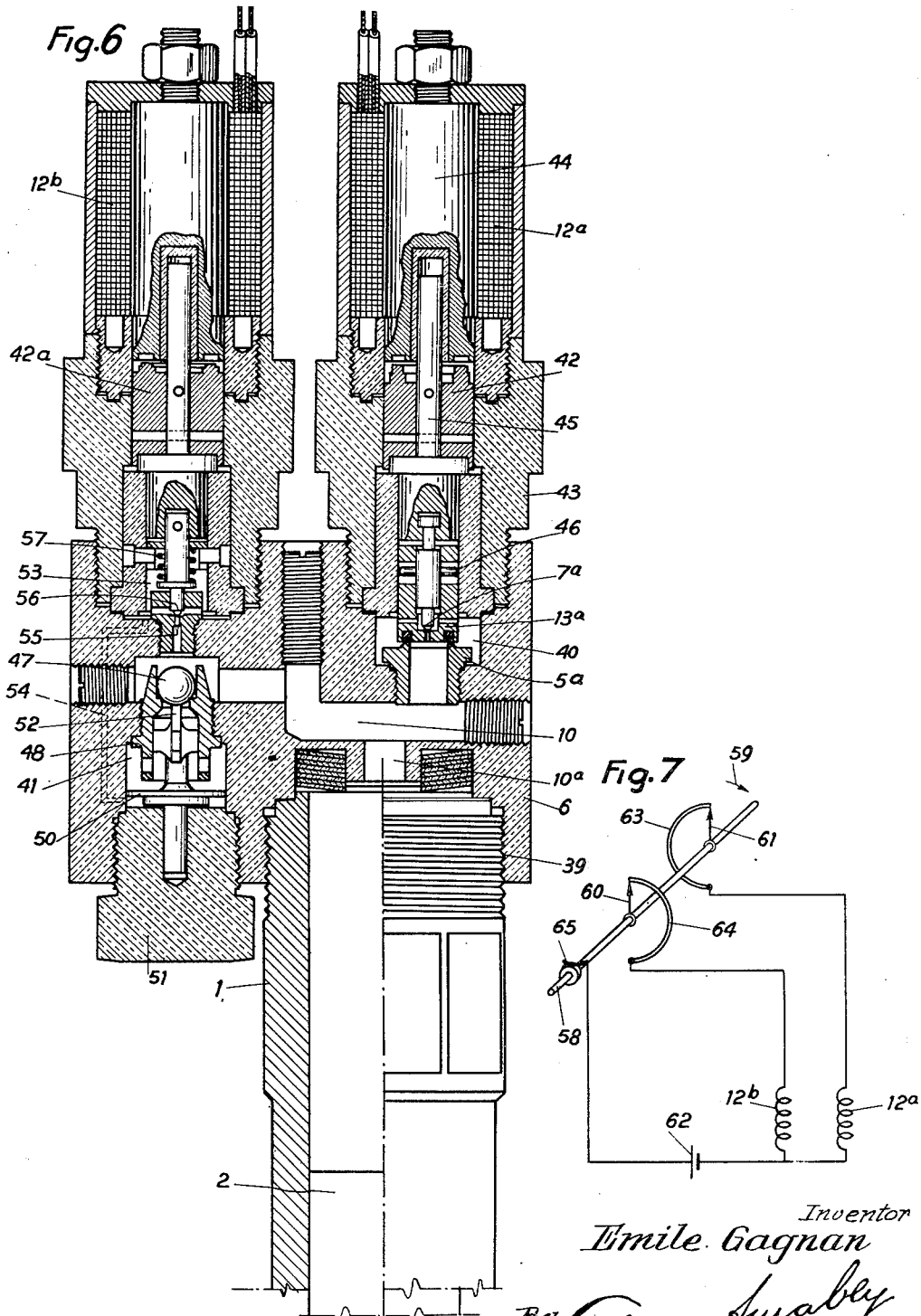

United States Patent Office 2,700,876
Patented Feb. 1, 1955

2,700,876

PLANT FOR FORCING GAS UNDER PRESSURE FROM THE LIQUEFIED GAS

Emile Gagnan, Montreal, Quebec, Canada, assignor to L'Air Liquide, Societe Anonyme pour l'Etude et l'Exploitation des Procedes Georges Claude, Paris, France Application December 3, 1951, Serial No. 259,513

9 Claims. (Cl. 62—1)

The present invention relates to improvements in plants for forcing gas under pressure from the liquefied gas, for example plants for filling oxygen containers under pressure, from liquefied oxygen.

Plants of this type, generally used, comprise a piston type pump which sucks in the liquefied gas, cooled if need be, and forces it into a coil in contact with a relatively hot fluid, and wherein the liquefied gas is vaporized or heated to the surrounding temperature if the forcing pressure is at least equal to the critical pressure; thence, the gas under pressure goes to a conduit under pressure, for instance the row of cylinders to be filled, the driving of the pump being generally effected by means of a motor utilizing an outside source of power. The gas, vaporized under pressure, however, has already been used as a source of power for supplying the motor which drives the pump. This solution, however, offers the drawback of requiring a relatively complicated apparatus comprising a number of mechanical difficulties, particularly for ensuring the tightness of the pistons.

The present invention makes it possible to obviate this drawback. It consists chiefly in that, in the plants of the above type in which the liquefied gas is forced into a vaporizer by a piston type pump with a valve gear type, utilizing the pressure of the vaporized gas, the piston surfaces in contact at one end with the vaporized gas and, at the other end with the liquefied gas to be forced back are equal, and in that means, such as electro-magnets or, in the case of a vertical pump, the weight of the piston, are provided for making up the stress necessary for the forcing back of the liquid.

The pump according to the invention, therefore, comprises a pump body consisting of a single cylinder, relatively long, in which a piston moves freely, consisting, for instance, of a single cylindrical block at the ends of which two chambers are provided, having a variable volume. One of them is filled with liquefied gas which is successively introduced in said chamber and evacuated therefrom by suction and delivery valves with which it is provided. The other chamber is put in communication, by means of distributing elements (for instance valves having a two-stroke opening, with an electro-magnetic control), successively with the vaporized gas in the vaporizer and with one or more chambers at a pressure lower than that of the vaporized gas.

During the compression period of the pump, the piston, formed by a single cylindrical body, is almost completely balanced under the action of the pressure of the vaporized gas, acting on the face in contact with it, so that the stress to be exerted on the piston for forcing the liquid back, is reduced to a low value. Under these conditions, the piston may be controlled by simple means, (return spring, electromagnet or even the mere weight of the piston made sufficiently heavy in the case of a vertical pump).

During the following period of suction of the pump, the action of the gas pressure of the vaporizer on the face of the piston is suppressed, and the gas chamber of the pump is placed in communication with a low pressure enclosure. The piston thus moves under the action of the pressure of the liquid sucked in, assisted, if need be, by the action of one of the above simple means.

The pump thus comprises at one of its ends, a cold portion (liquid chamber), and, at the other end, a warm portion (gas chamber).

To avoid a cooling of the warm chamber, the piston is given a sufficient length and preferably, as well as the cylinder, it is made of a metal which is a poor heat conductor.

The tightness of the piston is to be ensured only for the low difference in pressure between the liquid pressure in the cold chamber and the pressure of the vaporized gas; under such conditions, a relatively important clearance of about 0.1 mm. between the piston, consisting of a smooth cylindrical block, and the cylinder, is compatible with a satisfactory operation and offers interesting characteristics as regards seizing and the wear in the pump.

It should be noted that intermediate chambers may be provided between the two chambers, one for the liquid and the other one for gas, these intermediate chambers being provided either on the piston or on the cylinder, but in any case, these intermediate chambers should be put in communication with at least one of the two above mentioned chambers to balance the pressures.

In case it is desirable to balance the two faces of the piston as perfectly as possible, the gas from a small, distinct, vaporizing jet supplied with liquid from a small branch taken on the main vaporizer, preferably at the entrance thereof, is made to act on the not face of the piston. The loss of head of this auxiliary vaporizer is very low, since it uses only a small portion of all the vaporized gas.

The low pressure enclosure which is put in communication with the warm chamber of the pump during the suction period thereof, may consist either of the surrounding atmosphere, if it is not desired to recover the gas, or of a gasometer.

Another improvement of the present invention consists in putting the gas chamber, between the two operating strokes of the pump, in communication with a recovery chamber in which the pressure reaches an equilibrium before the gas exhausting phase. This recovery may be made more effective by putting successively several of these recovery chambers in communication with the gas chamber.

In case the installation is used for filling cylinders of compressed gas, these recovery chambers may consist of rows of cylinders which will be used later, for filling. The gas from the gas chamber is sent successively in these rows, the pressure in which is gradually decreasing, before being finally sent to the atmosphere. By operating in this manner, the amount of gas ejected to the atmosphere, and which constitutes a loss, is very small and practically negligible.

The gas escaping from the warm chamber of the pump may also be recovered by re-liquefaction and brought to the suction of the liquid. In case the pump receives the liquefied gas at a temperature lower than that of the equilibrium at its pressure (as the liquid may be undercooled), the partial or total recovery of escaping gas may be effected by the cold of this overcooled liquid by exchange along the delivery circuit of the pump.

Figures 1, 2, 3, 4, 4a and 5 represent, schematically, by way of example, types of embodiment of the improvements according to the invention.

Figure 6 shows, at a larger scale, a vertical section of the upper cylinder head of the pump, taken through a plane containing the axis of the inlet and outlet valves.

Figure 7 is a diagram showing the electric circuits controlling the valves of the device shown in Fig. 6.

Figure 1 shows, in axial section, a vertical pump comprising a cylindrical body 1 wherein a solid cylindrical piston 2 can move freely. At the lower end of the pump body 1, is secured a metal cylinder head 3 which carries a valve 4 for the suction of the liquefied gas and a valve 5 for the delivery of the liquefied gas. The valves shown on Figure 1 are of the ball type. At the upper end of the pump body, 1, is secured a metal cylinder head 6 which carries a valve 7 for the admission of the vaporized gas under pressure and a valve 8 for the exhaust of this expanded gas. The cylindrical body 1 is in permanent communication, at its lower portion, with a liquid chamber 9 and, at its upper portion, with a gas chamber 10, damping devices for the piston at the ends of its runs being provided at the two ends of the body 1. In the type of embodiment considered, these dampers consist of "Belleville" type washers, 11.

The valves 7 and 8 are conveniently controlled electromagnetically, windings 12 being provided to this effect and energized at the suitable instant of the pumping cycle by any suitable means. In order to cut down the stress to be applied to the valves 7 and 8 to open them, against the pressure which tends to hold them closed, these valves are preferably arranged as shown in Figures 1 and 2, this latter figure showing, on an enlarged scale, an axial section of a valve. The seat 13 of this valve is movable and consists itself of a valve having a large section as compared to the effective section of the valve 7; it is part of an assembly 14 which constitutes a movable valve box for the valve 7 and which is urged on a seat 15 of the cylinder head 6 by the spring 16 which acts also to close the valve 7. The balls 4 and 5 are called back to their closed position by springs 17 bearing on stop rings 18. The operation of the pump is as described above. As regards the operation of the valves 7 and 8 their opening is effected in two steps: upon the energizing of the corresponding electromagnet 12, the valve 7, for instance, is disengaged from its seat 13 which remains fixed, held by the high thrust exerted by the gas pressure on its relatively large area. The valve 7, of a relatively small section, is taken off without offering any important resistance and comes to bear against the ring 19 of the valve box 14. As soon as the valve 7 leaves its seat, the vaporized gas enters the chamber 10 through the port 20, exerting a thrust on the valve 13 in the opening direction, and this thrust or push increases rapidly to a value at which the attraction of the magnet becomes predominant, and lifts the valve 13 positively from its seat, thus establishing a positive communication between the vaporized gas and the chamber 10. The effects just described for the valves 7—13 also take place for the valves 8—21. Valves thus arranged are applicable in any case, to all pumps for liquefied gases, other than those having a constant section piston, specially considered in the present application.

In the embodiment of the upper cylinder head of the pump shown in Fig. 6, the head 6 is provided with a tapping 39 and screwed on the upper end of the pump cylinder 1. The chamber 10 which permanently communicates through the orifice 10a with the cylinder interior above the piston 2, is put in communication at the suitable instant of the pumping cycle, with the motive vaporized gas supply, through a cavity 40, and with the exhaust way through a cavity 41. The inlet valve 13a is devised according to the same principle as the valve 13 in Fig. 1; it is, however, not provided with an urging spring and falls back upon its seat 5a under the influence of its weight. The magnetic body 42 is slidably mounted in a hollow block 43 screwed on the head 6 and which supports, mounted on a fixed core 44, the coil 12a which corresponds to the coil 12 on the right side of Fig. 1. The movable body 42 is coupled to the valve 13a by the intermediary of the valve 7a the seat of which is provided on the valve 13a and corresponds to the small valve 7 of Fig. 1. The operation as far as the supply of the chamber 10 is concerned, remains that described in reference to Fig. 1. When the coil 12a is energized, the body 42 pulls, through the intermediary of a stem 45, the valve 7a which is suddenly separated from its seat and, through the intermediary of the pin 46, separates the valve 13a from its seat, as soon as the pressure in the chamber 10 has reached a value which is sufficiently close to that of the pressure in the cavity 40.

For the sufficient rapidity of the operation cycle of the pump, it is essential that as early as the beginning of the exhaust step, the pressure in the chamber 10 falls down as quickly as possible to its lowest value. To this end, the exhaust valve is operated at the suitable instant of the pumping cycle, in order to be suddenly separated from its seat. The exhaust valve, in the embodiment illustrated, consists in a ball 47 the seat of which is provided on a tubular member and it controls the communication between the chamber 10 and the exhaust cavity 41. The cavity 41 is constituted by a bore in which is mounted with a slight peripheric clearance, a piston 50 having a diameter fairly larger than the diameter of the seat for the ball 47 and guided by an axial rod in a plug 51 screwed in the head 6. The piston 50 when moved upwardly acts upon the ball through a push member 52. The cavity 41 permanently communicates, at its lower part, with a cavity 53 through passages provided in the head 6. The communication between the cavity 53 and the chamber 10 takes place at the suitable instant of the pumping cycle through a narrow orifice 55 controlled by a small valve 56 which is urged against its seat by a spring 57 the strength of which is determined so that the valve 56 remains applied on its seat even the pressure inside the chamber 10 reaches its maximum value. The valve 56 is coupled with a movable magnetic body similar to the body 42 and spaced apart from its seat upon the energization of the coil 12b.

At the suitable instant of the pumping cycle, the coil 12b is energized and the valve 56 is suddenly spaced apart from its seat; the chamber 10 is discharged through the passages 54, into the cavity 41 under the piston 50 which in spite of the leakage between its periphery and the wall of the cavity 41, is thrown upwardly and strikes the ball 47 which is suddenly moved apart from its seat for putting directly into communication the chamber 10 and the lower part of the cavity 41.

Fig. 7 is a diagram of the electric circuits for controlling the energization of the coils 12a and 12b of Fig. 6. Upon a shaft 58 driven into rotation at a uniform angular speed in the direction indicated by the arrow 59, by any suitable power source such for instance an electric motor having a very small power and coupled with the shaft 58 through a suitable reducing speed gear device, are secured two wipers passing through the axis of the shaft 58 and connected to one of the terminals of a battery 62, by the intermediary of a contact which rotates with the shaft 58 and a brush 63. The coils 12a and 12b are connected to the other terminal of the battery and connected respectively to conducting arcuate contacts 63 and 64 concentric with the shaft 58, the circumferential extent of the contacts determines the duration of the energization of the corresponding coils 12a and 12b and their relative angular position about the axis of the shaft 58 is determined in such a manner that the coil 12a is no more energized when the coil 12b begins to be energized, and reversely, a complete revolution of the shaft 58 corresponding to a complete pumping cycle. An arrangement like the distributor system in an automobile engine using several contact makers could be used for the same purpose.

As set forth above, the thrusts or reactions exerted on the two ends of the piston 2 practically balance, so that, in the liquid forcing phase, the weight of the piston is sufficient to overcome the friction of the piston and all the pressure drops of the circuit between the liquid outlet of the pump and the gas inlet at the upper head, if, as is the case for the embodiment shown in Figure 1, the pump is vertical or substantially vertical. In the liquid suction phase, the pressure of this liquid may be sufficient, alone, to lift the piston, but if not one can apply on the piston a slight pull which may conveniently be obtained by an electro-magnetic effect; use can also be made of the means mentioned above in the description of the general operation of the pump.

While the size of the piston will vary depending on the size of the pump it must be heavy enough to provide the necessary gravity pull. For example, in a free-piston pump with a piston two feet long, two inches in diameter, the piston will have a weight of about twenty (20) pounds. With a stroke of about 6 inches, a pump of this size should be able to pump about 500 litres of liquid oxygen per hour. The stroke frequency would be roughly thirty (30) strokes a minute.

Of course, the seizing of the piston in the cylinder, due to slight amounts of dust or solid particles which may be contained in the pumped liquid, is avoided by providing filters at the suction to the pump. There may also be used, with or without these filters, to avoid this danger, a metal piston, lined with a material preserving a certain elasticity or plasticity when cold, (for instance the material known as kel-f). A light, hard dust, wedged between the piston and cylinder, enters the plastic or elastic material of the piston and does not cause any seizing.

Of course, a piston may be used, entirely made of such a material, or the cylinder may be lined whereas a metal piston may be used.

It is possible, also, to balance the pressures on the two ends of the piston better, by means of the device shown in Figure 3. In this view, 23 is the main vaporizer, which is in communication through the conduit 24 with the delivery 25 (Figure 1) of the pump. Part of the liquid is shunted from the conduit 24 through the conduit 26, in which is inserted, before the input to the vaporizer 23 an auxiliary vaporizer 27, with a low load loss, at the output of which the vaporized gas is brought to the intake valve 7—13 (Figure 1) of the pump.

The two above arrangements are also applicable to any other pump for liquefied gas.

The diagram of Figure 4 shows an arrangement which makes it possible to recover part of the gas which escapes from the chamber 10 (Figure 1). In this arrangement, there is provided, in addition to the outlet 28, an outlet 29, connected through a conduit 30 with an additional row for cylinder filling 31. On the conduit 30 is inserted a valve 32 the design and control of which are similar to those of the valves 7 and 8. The general arrangement remains similar to that already described, and, on Figure 4, there are found, again, the main vaporizer 23, and the main row for cylinder, 33. The operation of the installation thus modified is as follows:

During pressure stroke of the pump as the liquid is impelled, the valve 7 is open and the valves 8 and 32 are closed. At the end of this phase the valve 7 closes, the valve 32 opens, the valve 8 remaining closed. The gas pressure is balanced between the chamber 10 and the cylinders 31. The valve 32 then closes and the valve 8 opens, and the suction phase for the liquid begins.

Figure 4a shows another way of arranging the valves on the upper end of the pump to attain the result described in connection with Figure 4. 80 is a check valve which blocks the gas which might return from the cylinders 31. During the impulsion of the liquid the valve 7 is open and the valve 8 is closed. At the end of the pressure or positive stroke of the piston 2, the valve 7 and 30a are closed, and the valve 8a is open, so as to balance the pressure of the chamber 10 with the inside pressure of the cylinders 31 through the check valve 80. Then the valve 32 is opened and the gas still under pressure in the chamber 10 escapes and the piston moves up.

In case the pump sucks in "undercooled" liquid, the gas evolved in the chamber 10 may be recovered by liquefying it again, and bringing it back to the suction of the pump. Figure 5 is a diagram of an installation designed for that purpose. The gas, upon issuing from the chamber 10 through the open valve 8 escapes through the conduit 34 and goes through an exchanger 35, in which it is placed in indirect contact with the liquid delivered by the pump and going to the vaporizer 23. The re-liquefied portion of the gas in the exchanger 35 goes to the suction 5 of the pump through the conduit 36. In this case, however, it is no longer possible to balance the thrusts on the two ends of the piston 2 to an extent which enables it to move up for the suction phase for the liquid. The upward motion of the piston should then be controlled by outside means, as already indicated. On the diagram of Figure 5, a control electro-magnet 37 is shown, which acts on a rod 38 of the piston 2.

In a similar case, the re-liquefied liquid can be recovered at a lower pressure to permit the use only of the load of the inlet liquid to raise the piston.

There can also be used an arrangement employing three valves, similar to that shown on Figure 4 and in which the valve 32 is connected to a liquefactor, cooled by the compressed liquid. In this case, the suction phase of the pump includes two stages—first, connection of the chamber 10 with the liquefactor and second, connection of the chamber 10 with the outside. The recuperation of the re-liquefied liquid can be effected wherever advisable, possibly in the storage tank.

What I claim is:

1. A pumping apparatus comprising the combination of a supply source of liquefied gas and a high pressure circuit including vaporizing means, a pump having a lower chamber for liquid gas to be pumped and an upper chamber for impelling-gas, a cylinder between said upper liquid chamber and said lower gas chamber, a free elongated gravity responsive piston mounted for reciprocal movement in said cylinder, the volumes of said chambers being inversely variable in accordance with the movement of the said piston, the lower liquid chamber of said pump being provided with inlet and outlet passages, respective valve means controlling said inlet and outlet passages, said inlet passage being connected to said liquefied gas supply source, said outlet passage being connected to said vaporizing means, the pump upper gas chamber including gas inlet and outlet passages, the said gas inlet being connected to said vaporizing means and the said gas outlet passage leading to low pressure, respective inlet and outlet valves controlling said gas inlet and outlet passages, and actuable means for controlling the said gas inlet and outlet valves in an alternating opening and closing cycle.

2. A pumping apparatus as claimed in claim 1, wherein the vaporizing means includes a first vaporizing unit adapted to vaporize a minor amount of said liquefied gas for the operation of said pump, and the outlet passage leading from the liquid chamber of said pump also connects with a further vaporizing unit.

3. A pumping apparatus as claimed in claim 1, wherein said vaporizing means includes a first vaporizing unit connected to said upper gas chamber and adapted for vaporizing liquid gas to supply sufficient gas for the operation of said pump and at least one further vaporizing unit connected only to the outlet passage of said lower liquid chamber of said pump.

4. A pumping apparatus according to claim 1, in which there is an additional gas outlet in said upper chamber connected with a storage vessel.

5. A pumping apparatus according to claim 1, in which the exhaust outlet from the upper chamber is connected through a heat exchanger to the liquid inlet of the lower chamber and the liquid outlet is also connected to said heat exchanger to pass liquid gas therethrough on its way to the vaporizer, and auxiliary power weight lifting means is connected to said piston to lift the piston against the pressure of the gas being forced through said gas outlet back into said liquid line.

6. A pump adapted for use in pumping liquid gas to vaporizing means, comprising, a pump body assembly including a lower chamber for liquid gas to be pumped and an upper chamber for vaporized gas, an elongated cylinder communicating with and extending between said upper and lower chambers, an elongated piston mounted for free gravity responsive reciprocal movement in said cylinder, the volumes of said upper and lower chambers being inversely variable in accordance with the movement of said piston, said lower liquid chamber being provided with inlet and outlet passages, pressure-responsive valve means controlling said inlet and outlet passages, said upper gas chamber including gas inlet and outlet passages, inlet and outlet valves controlling said gas inlet and outlet passages, and valve actuating means for controlling said gas inlet and outlet valves in an alternate opening and closing cycle, whereby, when said lower chamber inlet passage is connected to a source of liquefied gas and said lower chamber outlet passage is connected to a vaporizing means which in turn has a gas discharge outlet connected to said upper chamber gas inlet, opening of said gas inlet valves allowing gas under pressure to pass within said upper chamber to balance the pressure of said liquefied gas entering into said lower chamber causing the said piston to descend by gravity towards said lower chamber and forcing liquefied gas through said outlet passage to said vaporizing means, the alternate opening of said gas outlet valve exhausting said gas from said upper gas chamber and said piston is raised by the pressure of said liquefied gas, the opening and closing of said gas inlet and outlet valves being carried out in time related sequence.

7. A pump as claimed in claim 6, wherein the gas delivered to and from said upper chamber is of considerably higher temperature than the liquefied gas delivered and exhausted from said lower chamber, said cylinder and piston being of sufficient length to prevent excessive transfer of cold from said liquefied gas to said upper chamber and said piston being of sufficient weight to descend in pumping stroke by gravity only.

8. A pump according to claim 6, which is provided at at least one end of the cylinder with a Belleville spring adapted to dampen the movement of the piston at the end of its stroke.

9. A pump according to claim 6, wherein said gas outlet valve controlling said gas outlet passage is provided with a valve seat, a slidably mounted pushing member is mounted within said valve beneath said valve seat and is adapted to urge said valve from said seat, a small valve mounted within said main valve, a gas passage between said small valve and said pushing member, and means to operate said small valve in time related sequence with said gas inlet valve, whereby said small valve is adapted when opened to allow gas under pressure from said pump upper chamber to act against said pushing member urging it against said main valve, the opening of said main valve being adapted to exhaust quickly the gas from said pump upper chamber.

References Cited in the file of this patent

UNITED STATES PATENTS

| | | |
|---|---|---|
| Re. 19,054 | Heylandt | Jan. 16, 1934 |
| 2,050,526 | Gleason | Aug. 11, 1936 |
| 2,389,067 | Liberman | Nov. 13, 1945 |
| 2,467,413 | Wildhack | Apr. 19, 1949 |
| 2,595,379 | Cushman | May 6, 1952 |

FOREIGN PATENTS

| | | |
|---|---|---|
| 683,153 | Germany | Oct. 12, 1939 |
| 692,326 | Germany | May 23, 1940 |